CART STORAGE ASSEMBLY

Original Filed Sept. 16, 1969 3 Sheets-Sheet 1

INVENTOR:
RICHARD J. RUBIN
BY
Lilles, Thompson & Bronstein
ATTORNEYS

CART STORAGE ASSEMBLY

Original Filed Sept. 16, 1969 3 Sheets-Sheet 2

INVENTOR.
RICHARD J. RUBIN
BY
Dike, Thompson & Bronstein
ATTORNEYS

CART STORAGE ASSEMBLY

Original Filed Sept. 16, 1969 3 Sheets-Sheet 3

INVENTOR.
RICHARD J. RUBIN
BY
Mike, Thompson & Bronstein
ATTORNEYS

United States Patent Office

Re. 27,683
Reissued June 19, 1973

27,683
CART STORAGE ASSEMBLY

Richard J. Rubin, 39 Dolphin Road,
Newton, Mass. 02159

Original No. 3,608,920, dated Sept. 28, 1971, Ser. No. 858,342, Sept. 16, 1969, which is a continuation-in-part of Ser. No. 784,131, Dec. 16, 1968. Application for reissue Sept. 30, 1971, Ser. No. 185,446
Int. Cl. B62d *39/00*
U.S. Cl. 280—33.99 15 Claims

Matter enclosed in heavy brackets [ ] appears in the original patent but forms no part of this reissue specification; matter printed in italics indicates the additions made by reissue.

ABSTRACT OF THE DISCLOSURE

A cart storage assembly including one assembled cart which includes a substantially horizontal platform member, rollers for moving it along the floor and a pair of opposite end members extending upwardly from the platform member, a plurality of detached end members supported on the platform of the assembled cart in substantially parallel relationship to each other and to one end member of the assembled cart and a plurality of platform members detached from their end members, the detached platform members being supported on the platform of the assembled cart in substantially parallel relationship to each other and to one end member of the assembled cart.

BACKGROUND OF THE INVENTION

This hitch is described in my co-pending application Ser. No. 784,131 filed Dec. 16, 1968 of which this application is a continuation-in-part. This invention relates generally to wheeled carts which are used by warehousers to deliver products to their customers, for example to retail stores. Cartons containing the products are loaded on carts by the warehouser, the loaded carts are rolled on the trailer of a truck, delivered to the retail store, each cart is rolled to the place or places in the store where the products are to be displayed and then they are placed on the shelves or counters for display to the consumer.

The empty carts are stored in a storage area of the store until additional products are ordered from the warehouser and when he delivers the additional products he picks up the empty carts and returns them to the warehouse for use in subsequent shipments.

The floor area required to store the empty carts at the retailer's and the warehouser's places of business and also the truck trailer area necessary to return them to the warehouser is very extensive and this increases the storage and transportation costs in connection with such a system.

Accordingly, it is an object of this invention to provide a cart storage assembly which substantially reduces the floor storage area and the vehicle transportation area which is necessary to store or transport a plurality of empty carts.

Another object is to provide such a storage assembly which can be made quickly and by only one man thereby reducing the cost of labor.

Another object is to provide such an assembly which can be moved from place to place in the storage area and loaded on a truck trailer quickly and with a minimum of manual labor.

A still further object is to provide such an assembly which does not require the use of bolts, screws or the like.

Further objects and advantages of the invention will be apparent from the following description when considered in conjunction with the accompanying drawings.

SUMMARY OF THE INVENTION

In accomplishing the foregoing objects, the invention provides a cart storage assembly which requires as much as 80% less storage floor area and truck or trailer area for the storage and transportation of five carts for example.

Each assembled cart comprises a platform member having a substantially flat supporting surface, a plurality of rollers mounted beneath the platform member for rotation about axes which are substantially parallel to its surface, end supporting means attached to opposite ends of the platform member, and a pair of end members, one at each end of the platform member. Each end member is detachably supported by end supporting means in a plane which is substantially normal to the flat surface of the platform member.

The end members can be detached quickly and easily by one man who merely moves them upwardly away from the end supporting means.

The storage assembly of the invention involves the use of a first cart which is completely assembled and a plurality of additional carts, for example four, in which the end members are detached from the end supporting means of the platform members.

The detached end members are positioned upon the flat surface of the platform member of the first cart and arranged substantially parallel to each other and substantially parallel to one of the attached end members of the first cart. When the storage assembly is to be transported by a truck or other vehicle, preferably means is provided for holding the detached end members in this position, for example a strap or cord which passes around them and the adjacent still attached end member of the first cart.

The plurality of platform members of the carts from which the end members have been detached are placed on the first cart with their lower ends positioned upon the flat surface of the platform member of the first cart and preferably they are arranged with their flat surfaces substantially parallel to each other and substantially parallel to the attached end members of the first cart. Preferably they are located in the space between the plurality of detached end members and the attached end member at the opposite end of the first cart.

Preferably the substantially flat surface of one of the plurality of detached platform members is positioned adjacent to the still attached end member at the opposite end of the first cart from the end where the detached end members are located. The substantially flat surfaces of the other detached platform members preferably are positioned towards the peripheries of the rollers of the adjacent platform members respectively.

Since the storage of five carts with the storage assembly of this invention requires a floor area which is only substantially equal to the area of the platform of the assembled first cart, 80% less storage and transportation area is required for the storage and transporation of five carts than with the prior art system.

Furthermore, the storage assembly can be made quickly by only one man and it can be easily and quickly moved from place to place in the storage area and loaded on the truck or trailer by merely pulling it on the rollers of the assembled first cart.

While I have given an example using five carts, the number of carts used to make a single storage assembly will depend upon the areas of (1) the surface of the platform, (2) the ends of the platform members and (3) the ends of the end members.

DESCRIPTION OF THE PREFERRED EMBODIMENT

Figure 1:
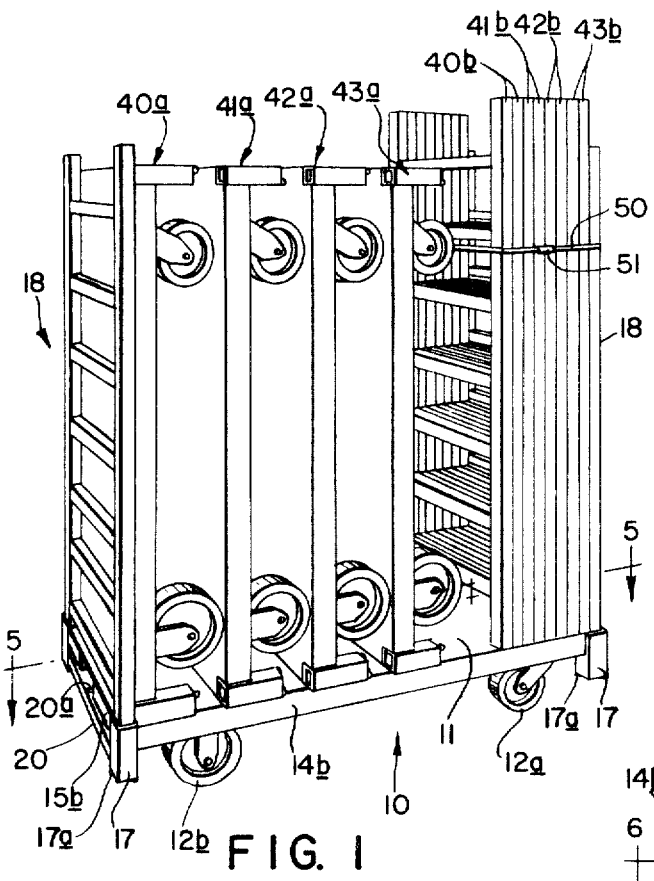
FIG. 1 is a perspective view of a cart storage assembly embodying the present invention.

As illustrated in the drawings, the cart storage assembly consists of a first cart which is assembled and the parts of four identical partially disassembled carts are positioned on the platform of the first cart in accordance with this invention for conservation of floors area in the places of business of the manufacturer, the warehouser and the ultimate user and the conservation of trailer space in the transportation thereof from the user or the manufacturer to the warehouser.

The assembled first cart 10 (FIG. 7) includes a platform member 11 having a substantially flat surface for supporting the products sold by the warehouser to its customers, which may be packaged in cartons for convenience in stacking. A pair of front rollers 12a and a pair of rear rollers 12b are supported by the members 13a and 13b for rotation about axes which are substantially parallel to the upper flat surface of the platform member. The platform member 11 includes side members 14a and 14b and end members 15a and 15b, the members 15a and 15b being provided with central openings for reasons to be described below.

The hollow end supporting members 17 are secured to the side and end members 14a, 14b, 15a and 15b and are partially closed at their bottoms by members 17a.

Figure 6:
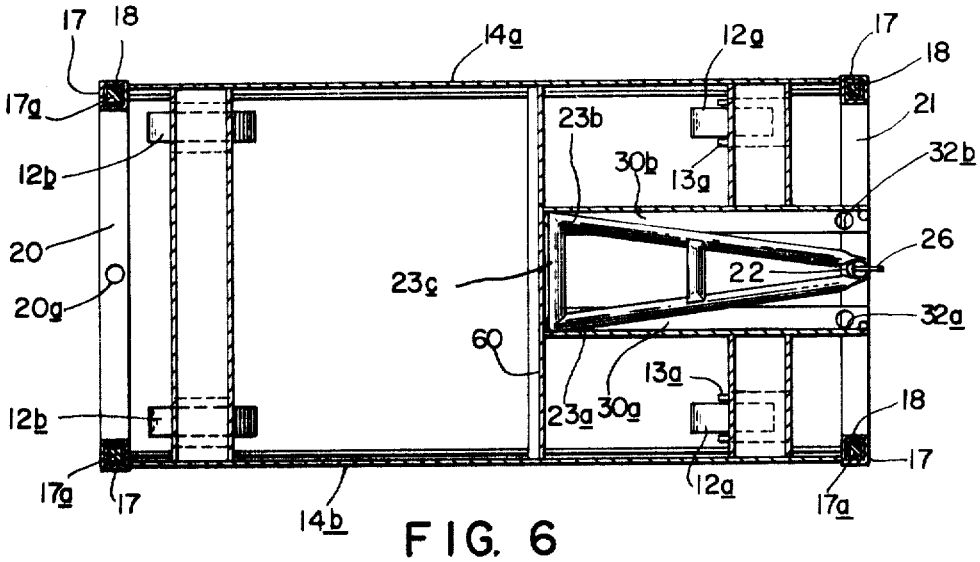
FIG. 6 is a section on the line 6—6 of FIG. 4.

A pair of end members 18 are detachably supported by the end supporting members 17, their lower ends being slideably received in the hollow members 17 as shown in FIG. 6.

At the rear end of the cart, there is provided a cross or structural member 20 coupled to the end supporting members 17. A hole 20a (see FIGS. 1 and 6) is provided in this structural member so that the hitch of one cart may be pivotally coupled to the cart in front of it.

Figure 4:
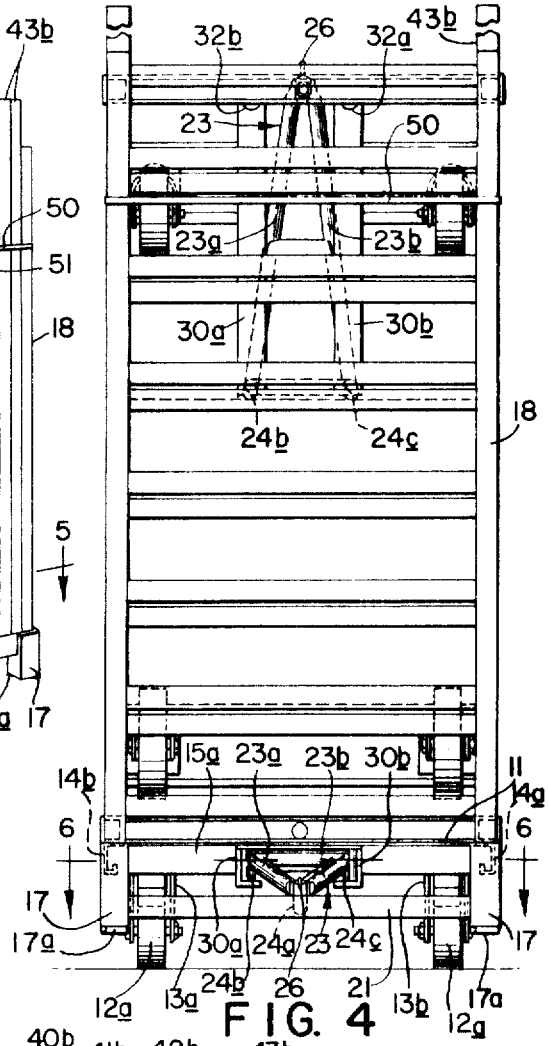
FIG. 4 is an enlarged end view of the assembly looking from right to left at FIG. 1 with the tops of the stacked end members broken away.
Figure 7:
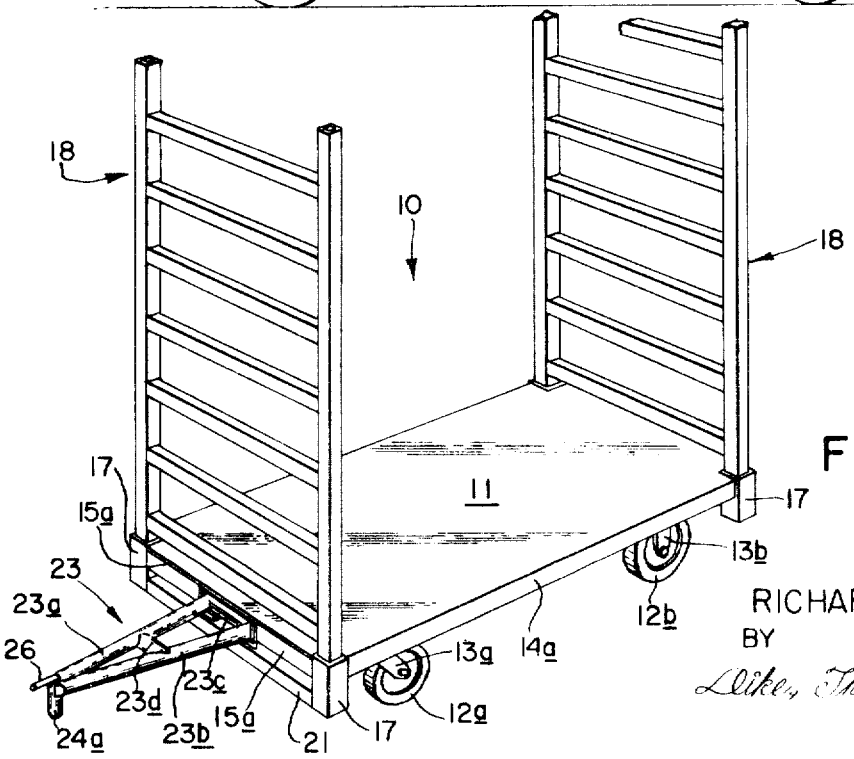
FIG. 7 is a perspective view of an assembled cart which forms part of the cart storage assembly of this invention.
Figure 5:
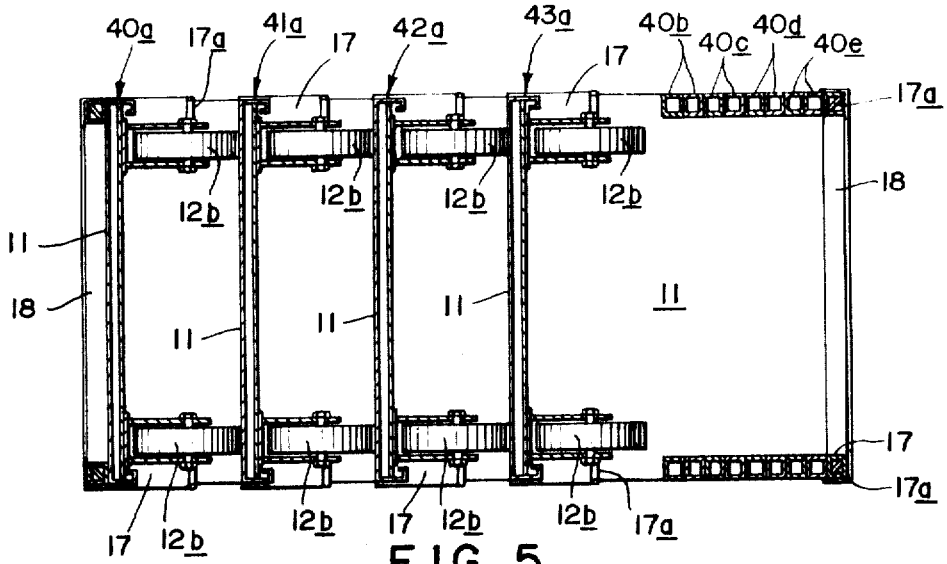
FIG. 5 is an enlarged section on the line 5—5 of FIG. 1.

At the front of the cart, the structural member 21 is coupled between the end supporting members 17 and it is provided with a central hole 22 (FIGS. 4, 6 and 7).

The retractable hitch member 23 (FIGS. 4, 6 and 7) has two elongated side members 23a and 23b, an end member 23c and a center cross piece 23d. These parts may be welded together to form the generally triangular shaped hitch member 23.

At the front end of hitch member 23, a downwardly extending pin 24a is provided and the member 26 projects forwardly from the pin 24a so that the front end of the hitch member 23 may be raised and moved to desired positions as explained below.

A pair of downwardly extending pins 24b and 24c (FIG. 4) are provided at the rear corners of the hitch member 23. During movement of the hitch member from its extended position shown in FIG. 7 to its retracted position shown in FIGS. 3, 4 and 6, the lower ends of the pins 24b and 24c slide upon the upper surfaces of the inwardly extending flanges of the L-shaped members 30a and 30b. These L-shaped members are welded to the bottom of the platform 11 and the cross frame member 60 (FIG. 6).

Flanges of members 30a and 30b are provided with holes 32a and 32b (FIG. 6) for receiving the pins 24b and 24c when the hitch is in fully extended position.

The central opening formed in the member 15a is of a dimension such that the sides of the opening prevent the rear portion 23c of the hitch member 23 from being slid completely out of the front of the cart.

When the hitch member is fully retracted, the pin 24a is positioned in the hole 22 of the member 21 so this hole serves to retain the hitch in its retracted position. The bottom side of the platform 11 acts as an upper stop to limit the upward movement of the hitch member 23 during sliding movements.

With the hitch extended, the pin 24a is inserted in the hole 20a of a cart which is positioned in front of the cart on which the hitch is located, then when the forward cart is pulled the rear cart is moved by virtue of the location of this pin in this hole.

However, the invention of the present application is not dependent upon what type of hitch is used although it is preferred that the carts be provided with removable or retractable hitches to conserve vertical space.

To provide a cart assembly of this invention, a plurality of carts of the same construction are partially disassembled by detaching the end members 18 from the platform members 11. This is a simple operation because they are merely lifted upwardly and their lower ends slide out of the hollow end supporting members 17.

Figure 2:
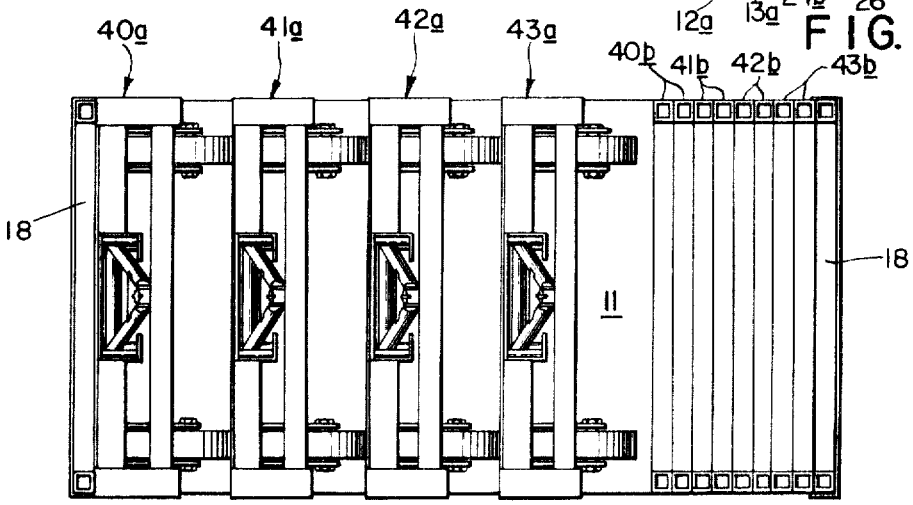
FIG. 2 is an enlarged top plan view of the assembly of FIG. 1.

Four partially disassembled carts are shown in FIGS. 1 to 5, the platform members which include the attached rollers and hitches being designated by the numerals 40a, 41a, 42a and 43a and the end members being designated by the numerals 40b, 41b, 42b and 43b. Preferably the hitch members 23 are in their retracted positions as shown in FIG. 2.

The detached end members 40b to 43b are positioned vertically on the substantially flat upper surface of the platform member 11 of the still assembled first cart 10 so they are substantially parallel to the adjacent end member 18 of the first cart.

The detached platform members 40a to 43a are also positioned vertically on the substantially flat upper surface of the platform 11 of the first cart with the flat outer faces of the lower end supporting means resting upon said surface. In this position, the substantially flat surfaces of the detached platform members are substantially parallel to each other and to the end members 18 of the first cart 10 and they are located in the space between the detached end members and the opposite end member 18 of the still assembled first cart 10.

Figure 3:
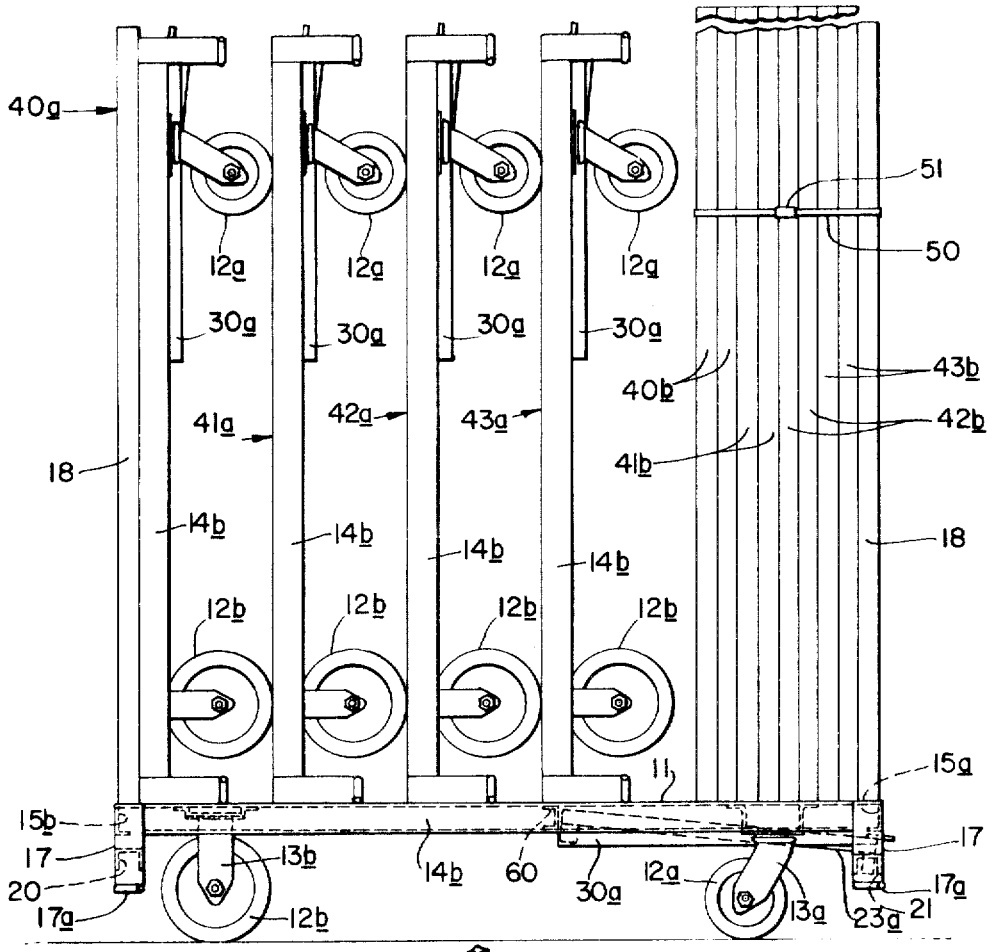
FIG. 3 is an enlarged side elevational view of the assembly of FIG. 1 with the tops of the stacked end members broken away.

Preferably, the flat surface of the detached platform member 40a is positioned adjacent to the adjacent end member 18 of the first cart and the flat surfaces of the other platform members 41a, 42a, and 43a are positioned near the peripheries of the rollers of the adjacent platform members respectively as shown in FIG. 3.

According to one commercial embodiment, the assembled first cart weighs about 200 lbs., each end member weighs about 15 lbs. and each platform member including its rollers and hitch member weighs about 170 lbs.

Due to the weight of each platform member, a plurality of them, 40a through 43a will remain in the position shown in the drawings when the first cart is pulled around the manufacturer's, the user's or the warehouser's place of business and also when the storage assembly is shipped from the manufacturer's or user's place of business to the warehouser's place of business for example by a truck or trailer. Consequently no means for attaching the plurality of detached platform means to the first truck is necessary but such means may be provided without departing from this invention.

The detached end members 40b through 43b will remain in the erect positions shown in the drawings without the use of the strap 50 for detachably holding them to the end member 18 when the storage assembly is stored at the manufacturer's, the user's or the warehouser's place of business but when the storage assembly is shipped from the manufacturer's or the user's place of business to the warehouser's place of business it is necessary to provide means for holding them to the end member 18. This may be done with the metal strap 50 the ends of which are secured together by a clip 51. Other means may be used such as a strip of plastic, a cord or the like.

The parts of the carts can be arranged in the storage assembly of this invention very quickly and by only one man. No tools, bolts or the like are required.

The floor area and the truck platform area required for storing and shipping five carts combined in this cart storage assembly is reduced by 80%, thus greatly reducing the cost of renting or ownership of the manufacturer's, the user's and the warehouser's storage space as well as the cost of transporting empty carts from the manufacturer's or the user's place of business to the warehouser's place of business.

While one desirable embodiment of the invention has been shown in the drawings, it is to be understood that this disclosure is for the purpose of illustration only and that various changes in shape, proportion and arrangement of parts as well as the substitution of equivalent elements for those herein shown and described, may be made without departing from the spirit and scope of the invention as set forth in the appended claims.

I claim:

1. A cart storage assembly comprising, a first cart which comprises platform means comprising a substantially flat supporting surface, a plurality of roller means mounted beneath said substantially flat supporting surface for rotation about axes which are substantially parallel to said substantially flat supporting surface, and two pairs of hollow end supporting members extending downwardly from said substantially flat supporting surface, one pair at each end of said substantially flat supporting surface, each pair of hollow end supporting members having substantially flat outer surfaces which are in a plane which is substantially normal to the plane of said substantially flat supporting surface, and a pair of end members, one at each end of said platform means, *each end member comprising a pair of elongate members and a plurality of means for connecting them together in spaced relationship*, each end member being detachably supported by a pair of said hollow end supporting members in a plane which is substantially normal to said substantially flat supporting surface of said platform means, a plurality of detached end members of other carts which are similar in construction to the end members of said first cart, said detached end members being positioned upon said substantially flat surface of said first cart and arranged substantially parallel to each other and substantially parallel to one of said attached end members of said first cart, and a plurality of detached platform means of said other carts which are similar in construction to the platform means of said first cart, each with one pair of its said hollow end supporting members positioned upon said substantially flat supporting surface of said first cart, at least two of said plurality of detached platform means being arranged with their said substantially flat supporting surfaces substantially parallel to each other and to the other attached end member of said first cart, and the center of gravity of each of said latter two detached platform means residing in a vertical plane which passes through said *last mentioned* pair of hollow end supporting members.

2. A cart storage assembly according to claim 1 wherein said plurality of platform means are located in the space between said plurality of detached end members and said other attached end member of said first cart.

3. A cart assembly according to claim 1 which also comprises means for detachably holding said detached end members to said one attached end member of said first cart.

4. A cart assembly according to claim 3 wherein said means for detachably holding comprises a strap.

5. A cart assembly according to claim 1 wherein the substantially flat supporting surface of one of said plurality of detached platform means is positioned adjacent to said other attached end member of said first cart.

6. A cart assembly according to claim 5 wherein the substantially flat surface of a second of said plurality of platform means is positioned adjacent to the peripheries of the roller means of said one detached platform means.

7. A cart assembly according to claim 6 wherein the substantially flat supporting surface of a third of said plurality of platform means is positioned adjacent to the peripheries of the roller means of said second detached platform means.

*8. A cart storage assembly comprising;*

*(a) a first cart which comprises*

*(i) platform means having an upper substantially flat supporting surface, roller means mounted beneath said platform means for providing mobility thereto, and two pairs of end supporting members mounted to said platform means, one said pair disposed adjacent each end of said substantially flat supporting surface, each said pair of end supporting members having outer surfaces disposed in a plane which is substantially normal to the plane of said substantially flat supporting surface, and*

*(ii) a pair of end members, each end member comprising a pair of elongate members and a plurality of means for connecting them together in spaced relationship, one said end member disposed at each end of said substantially flat supporting surface, each said end member detachably supported by a pair of said end supporting members in a plane which is substantially normal to said substantially flat supporting surface, and*

*(b) additional cart members including*

*(i) a plurality of detached end members of additional carts which are similar in construction to said end members of said first cart, said detached end members supported by and extending upwardly from said platform means, and*

*(ii) a plurality of detached platform means of additional carts which are similar in construction to said platform means of said first cart, each said detached platform means having one pair of its said end supporting members positioned upon said substantially flat supporting surface of said first cart, at least two of said plurality of detached platform means disposed with their said substantially flat supporting surfaces substantially parallel to each other and to said pair of first cart end members and the center of gravity of each said at least two detached platform means residing in a vertical plane which passes through its said last mentioned pair of end supporting members.*

*9. A cart storage assembly according to claim 8 wherein said detached end members are disposed substantially parallel to each other.*

*10. A cart storage assembly according to claim 9 wherein said detached end members are disposed substantially parallel to said pair of first cart end members.*

*11. A cart storage assembly according to claim 8 wherein said plurality of detached platform means are disposed with their substantially flat supporting surfaces substantially parallel to each other.*

*12. A cart storage assembly according to claim 11 wherein said detached platform means are disposed with their substantially flat supporting surfaces substantially parallel to said detachably supported first cart end members.*

*13. A cart storage assembly according to claim 8 including means for detachably holding said plurality of detached end members to one attached end member of said first cart.*

*14. A cart storage assembly according to claim 13 wherein said detachable holding means comprises a strap.*

*15. A cart storage assembly according to claim 8 wherein said detached end members are supported by said first cart substantially flat supporting surface.*

References Cited

The following references, cited by the Examiner, are of record in the patented file of this patent or the original patent.

UNITED STATES PATENTS

| | | | |
|---|---|---|---|
| 1,745,258 | 1/1930 | Hallowell | 280—79.1 |
| 845,673 | 2/1907 | Vanmanen | 280—79.1 |
| 1,879,214 | 9/1932 | Hallowell et al. | 280—79.1 X |
| 2,472,989 | 6/1949 | Skipper et al. | 280—79.1 X |
| 2,165,603 | 7/1939 | Yeats | 280—179.1 |
| 2,712,452 | 8/1951 | Hallowell et al. | 280—79.1 |

MILTON BUCHLER, Primary Examiner

G. W. O'CONNOR, Assistant Examiner